Patented June 11, 1929.

1,716,966

UNITED STATES PATENT OFFICE.

DOMINIC DI LEONARDO, OF PITTSBURGH, PENNSYLVANIA.

METHOD OF TREATING SPAGHETTI AND SIMILAR FOODSTUFFS.

No Drawing.   Application filed December 30, 1927.   Serial No. 243,768.

The invention relates to spaghetti, macaroni, and similar foodstuffs made from farinaceous materials, and it has to do especially with an improved method of preparing such foodstuffs for canning.

Spaghetti, vermicelli, macaroni and related articles of diet are generally made by pressing a suitable dough through dies, to form tubes, rods or other shapes, and the pressed material is then subjected to a protracted drying operation, the object of which is to harden the material so that it can be handled and packaged, and to prevent spoilage.

The drying operation is considered by many to be the most critical and at the same time the most difficult part of the process to control, because it must be done slowly and at a uniform rate. The quality of the product depends largely upon this operation and owing to variations in atmospheric temperature and humidity, it is often difficult to uniformly dry a given batch, or successive batches, of product. Chiefly for this reason, uniformity of product is not always secured, and losses may be frequent, either because the improperly dried material spoils, or because its quality after drying is such that it must be re-processed. When properly dried, these foodstuffs are hard and brittle.

Other disadvantages are also inherent in this dehydrating and hardening step, since it requires a considerable length of time, usually not less than 48 hours, and often up to three days or more. Consequently a large amount of floor space is required for the necessary driers, and the operation costs may also be considerable.

Although large amounts of spaghetti and the like farinaceous products are sold in the hardened and uncooked condition, very considerable and increasing quantities are now marketed in a cooked state, in hermetically sealed containers. Heretofore it has been considered necessary and essential in the preparation of canned spaghetti to fully dry it before it is cooked, the drying and hardening being conducted in the same manner as outlined above. Thus all of the cooked and canned foodstuffs of the class referred to must have added to their cost the burden of the dehydrating operation, with its considerable overhead charges.

An important object of the present invention is to provide a method of preparing these articles of diet for canning, in which the length of the drying operation is materially reduced, and in which the pressed material is not fully hardened at any time, thereby substantially decreasing the drying step with its troublesome control, and making it possible to uniformly produce a high quality product.

Other objects of the invention are to provide a process of the type referred to which overcomes the need for extensive drier equipment, which is capable of easy and uniform control, reduces handling of the material, decreases the cooking time, and which in general cuts down manufacturing costs and difficulties.

The method according to the invention comprises the preparation of a suitable dough, which is pressed or otherwise shaped into the desired form, after which it is partially dehydrated, and the material as thus dried is then cooked and canned. The partial dehydration comprises an important feature of the invention, and it consists in drying the pressed material to a point where it can be handled without the pieces sticking, but short of the full hardening heretofore considered necessary.

The preparation of the dough and its forming into tubes, rods or other shapes constitutes no part of the present invention, and being fully known to the art, require no detailed description here. Although the invention is applicable to farinaceous products generally which are manufactured in a manner similar to that hereinbefore explained, it is preferably practiced in connection with spaghetti, or macaroni, or vermicelli, these foods being usually made from semolina flour.

In the practice of the invention the shaped dough is transferred to a drier, which may be any one of the types now in general use for this work, the short-cut varieties being handled on trays and the longer varieties on rods. The drying operation is conducted so as to remove only a part of the water in the dough, as compared to the prior substantially complete drying. The extent of this dehydration will depend somewhat upon the condition of the dough, and upon the amount of handling necessary and time elapsing after the partial drying. It may be said that in general only sufficient moisture will be driven out of the dough to permit ready handling of the material without the individual pieces sticking together. In no case does the invention contemplate carrying the drying to a point where the material is hardened to the extent necessary for merchandising in the dry, uncooked condition.

When it has been dried to the proper point, as described above, the material is removed from the drier, and is ready for cooking, and this operation is carried out in the same manner as is now done with the thoroughly dried and hardened material, this process being fully understood in the art.

The essence of the invention consists in the application of short drying, insufficient to fully harden, and cooking this partially dried product. A great advantage of the process is shown by the fact that the necessary drying will require but a very short period of time, usually only about one or two hours, as compared with an average of 48 hours required in prior processes. This feature alone insures a considerable saving in drier installation and operating costs, and substantially eliminates all losses due to faulty drying which attend the prior processes. Furthermore, such short dehydrating periods will be easier to control, thereby insuring greater uniformity of product. In addition, further advantages are evident in the cooking step. This partially dried and still relatively soft material can be cooked in much less time than is required in the prior process, requiring about 30 to 40 per cent less time, because it rehydrates more easily and quickly than the hard-dried materials now used. Also, because the materials are dried for so short a time and can be cooked more quickly, the final product has a superior flavor.

The cooking and canning steps can be performed in a number of ways. For example, the material as it comes from the driers can be cooked in ordinary pans, then packed and sealed; or it can be placed in open cans, cooked and sealed; or it can be packed, sealed and then processed. The manner of cooking and sealing is not determinative, and my invention applies to any of them which are satisfactory. Furthermore, the cooking can be done in water, brine, or sauces, as desired, and water or sauce can be added when the packing operation is carried out.

Thus the invention provides a process of preparing cooked spaghetti and the like, in which the shaped dough is dried partially and cooked, which requires less time than older processes, reduces losses, and decreases costs and equipment and floor space, which produces a more uniform product than has heretofore been possible, and which requires less cooking and is of better flavor.

According to the provisions of the patent statutes, I have explained the principle and mode of operation of my invention, and have described what I now consider to be its best embodiment. However, I desire to have it understood that, within the scope of the appended claims, the invention may be practiced otherwise than as specifically described.

I claim as my invention:

1. The method of preparing cooked spaghetti and the like farinaceous foodstuffs comprising preparing a dough, forming the dough in a press, partially drying the moist, formed material and cooking the foodstuff as thus partially dried.

2. The method of preparing cooked spaghetti and the like farinaceous foodstuffs for canning comprising preparing a dough, forming the dough, removing sufficient water from the moist, formed material to permit handling but short of full drying, and cooking and rehydrating the foodstuff as thus dried.

3. The method of preparing cooked farinaceous foodstuffs for canning comprising preparing a semolina dough, forming the dough in a press, dehydrating the pressed material to a point sufficient to prevent sticking but short of full hardening, and cooking the thus dehydrated material.

In testimony whereof, I sign my name.

DOMINIC DI LEONARDO.